(12) United States Patent
Shinar et al.

(10) Patent No.: US 10,848,336 B2
(45) Date of Patent: *Nov. 24, 2020

(54) SYSTEM, DEVICE, AND METHOD OF MULTI-PATH WIRELESS COMMUNICATION

(71) Applicant: OLIBRA LLC, Cresskill, NJ (US)

(72) Inventors: Zohar Shinar, Demarest, NJ (US); Christopher Andrew Merck, Sussex, NJ (US); Bradley Luke Totaro, Sussex, NJ (US); Joao Ricardo Mattos e Silva, Florianópolis (BR); Marcio Granzotto Rodrigues, Florianópolis (BR); Natan Grando, Florianópolis (BR)

(73) Assignee: OLIBRA LLC, Cresskill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,574

(22) Filed: May 7, 2020

(65) Prior Publication Data

US 2020/0267014 A1 Aug. 20, 2020

Related U.S. Application Data

(63) Continuation of application No. 16/214,079, filed on Dec. 9, 2018, now Pat. No. 10,673,646.

(51) Int. Cl.
| | |
|---|---|
| *G05B 15/02* | (2006.01) |
| *H04L 12/28* | (2006.01) |
| *H04L 29/08* | (2006.01) |
| *H04L 1/18* | (2006.01) |
| *H04L 5/00* | (2006.01) |
| *H04W 4/80* | (2018.01) |

(52) U.S. Cl.
CPC ........ *H04L 12/2816* (2013.01); *H04L 1/1896* (2013.01); *H04L 5/0055* (2013.01); *H04L 67/125* (2013.01); *H04W 4/80* (2018.02); *H04L 2012/2841* (2013.01)

(58) Field of Classification Search
CPC . H04L 12/2816; H04L 1/1896; H04L 5/0055; H04L 67/125; H04L 2012/2841; H04W 4/80
USPC .............................................. 700/9; 340/7.39
See application file for complete search history.

(56) References Cited

U.S. PATENT DOCUMENTS

| | | | | |
|---|---|---|---|---|
| 8,855,793 | B2 * | 10/2014 | Bhargava | H04M 1/72533 700/47 |
| 10,129,733 | B2 * | 11/2018 | Narang | H04W 76/10 |

(Continued)

*Primary Examiner* — Kerri L McNally
*Assistant Examiner* — Thang D Tran
(74) *Attorney, Agent, or Firm* — Eitan Mehulal Sadot

(57) ABSTRACT

System, device, and method of multi-path wireless communication. A method includes: constructing in an electronic device of a user, a control message indicating a user command intended to be performed by a Home Automation Device (HAD) of the user; wherein the constructing includes inserting into the control message a unique Message-Identifier. The method then transmits the control message, from the electronic device of the user to the HAD, concurrently via at least two different wireless communications channels which include at least: (i) a first wireless communication channel that includes passage of traffic through the Internet, and (ii) a second wireless communication channel in which no traffic passes through the Internet.

18 Claims, 1 Drawing Sheet

(56) References Cited

U.S. PATENT DOCUMENTS

| | | | | |
|---|---|---|---|---|
| 10,644,961 B2* | 5/2020 | Nolan | | H04L 41/0654 |
| 2005/0005002 A1* | 1/2005 | Bodin | | H04L 12/2827 |
| | | | | 709/223 |
| 2005/0131551 A1* | 6/2005 | Ruutu | | G05B 15/02 |
| | | | | 700/1 |
| 2006/0031457 A1* | 2/2006 | Motoyama | | H04W 76/14 |
| | | | | 709/224 |
| 2008/0258666 A1* | 10/2008 | Carmen | | E06B 9/68 |
| | | | | 318/470 |
| 2010/0177900 A1* | 7/2010 | Hahn | | H04W 12/0609 |
| | | | | 380/277 |
| 2012/0075060 A1* | 3/2012 | Connor | | G06F 19/3418 |
| | | | | 340/5.54 |
| 2014/0258434 A1* | 9/2014 | Hong | | H04L 51/04 |
| | | | | 709/206 |
| 2015/0187209 A1* | 7/2015 | Brandt | | H04L 65/80 |
| | | | | 340/12.22 |
| 2015/0325112 A1* | 11/2015 | McPherson | | H04W 4/00 |
| | | | | 455/419 |
| 2015/0347114 A1* | 12/2015 | Yoon | | H04L 12/2832 |
| | | | | 235/375 |
| 2016/0047391 A1* | 2/2016 | McPherson | | F04D 25/088 |
| | | | | 417/423.7 |
| 2016/0075015 A1* | 3/2016 | Izhikevich | | B25J 9/163 |
| | | | | 700/253 |
| 2016/0075016 A1* | 3/2016 | Laurent | | B25J 13/006 |
| | | | | 700/47 |
| 2016/0075017 A1* | 3/2016 | Laurent | | B25J 9/163 |
| | | | | 700/264 |
| 2016/0075034 A1* | 3/2016 | Laurent | | H04L 12/282 |
| | | | | 700/264 |
| 2016/0087933 A1* | 3/2016 | Johnson | | H04W 12/0023 |
| | | | | 709/245 |
| 2016/0364963 A1* | 12/2016 | Matsuoka | | G10L 25/51 |
| 2017/0272316 A1* | 9/2017 | Johnson | | H04L 67/34 |
| 2018/0019889 A1* | 1/2018 | Burns | | H04L 12/4625 |

* cited by examiner

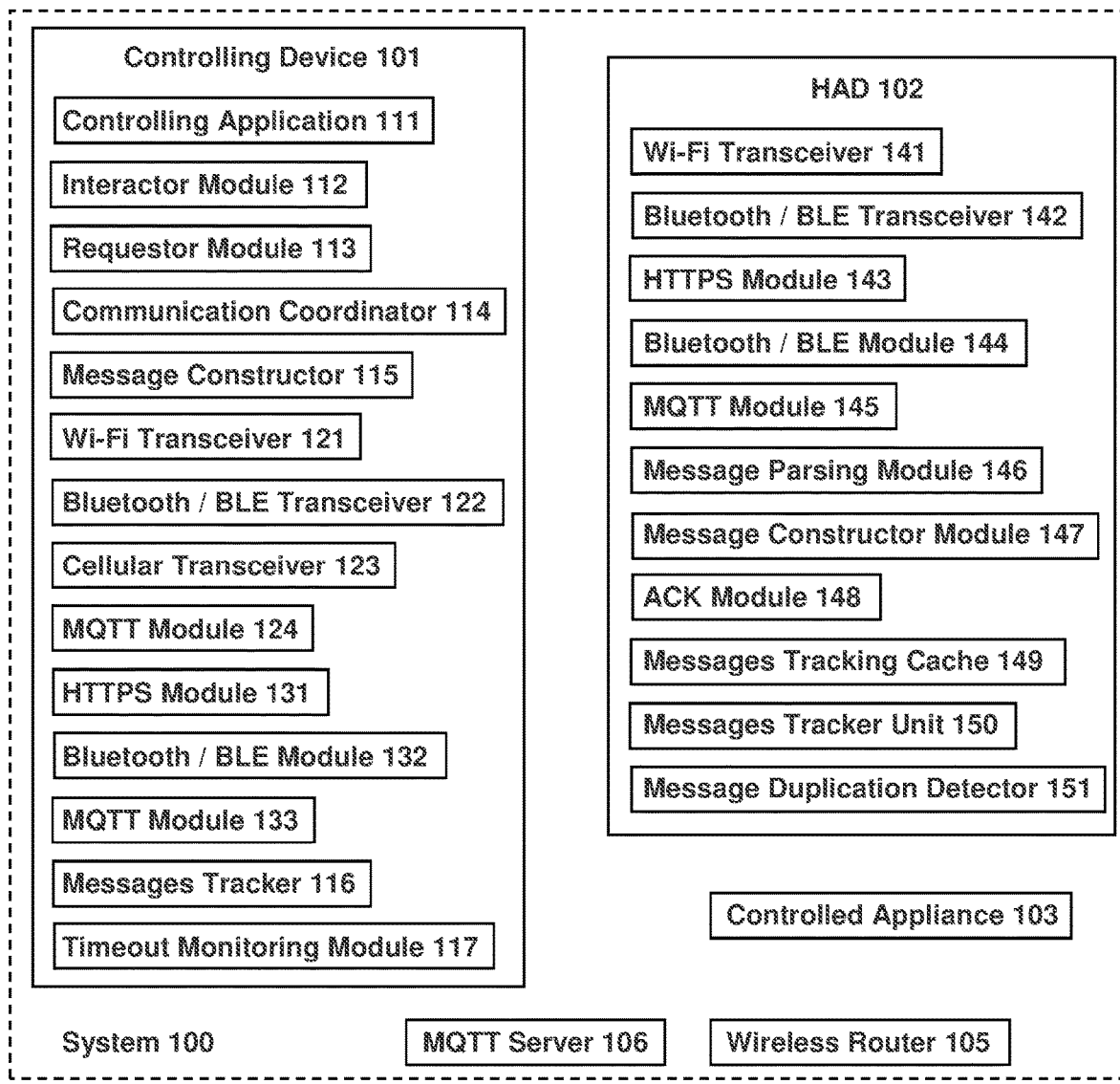

SYSTEM, DEVICE, AND METHOD OF MULTI-PATH WIRELESS COMMUNICATION

CROSS-REFERENCE TO RELATED APPLICATIONS

This patent application is a Continuation of U.S. Ser. No. 16/214,079, filed on Dec. 9, 2018, which is hereby incorporated by reference in its entirety.

FIELD

The present invention relates to the field of communication systems.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments of the present invention may provide systems, devices, and methods of multiple-path (multi-path) wireless communication; and particularly, de-duplication or non-duplication of multipath requests, providing reduction or minimization or latency, as well as automatic failover mechanism utilizing Internet of Things (IoT) protocols.

The present invention may provide other and/or additional advantages and/or benefits.

BRIEF DESCRIPTION OF THE DRAWINGS

FIG. 1 is a schematic illustration of a system, in accordance with some demonstrative embodiments of the present invention.

DETAILED DESCRIPTION OF SOME DEMONSTRATIVE EMBODIMENTS

The present invention enables efficient control of home automation devices and systems, as well as efficient and improved control of various devices and appliances that are controlled via such home automation devices, and/or that are controlled (e.g., directly, or indirectly) via an end-user device such as a smartphone or a tablet. For example, a user utilizes an end-user device or an electronic device, such as a smartphone or tablet or smart-watch or a touch-screen electronic device (referred to herein as "the Controlling Device"), in order to provide user input (e.g., by clicking or tapping or selecting on-screen GUI elements). The Controlling Device communicates with a Home Automation Device (HAD), such as Amazon Echo or Google Home or other home automation hub, or a particular or dedicated or specific-purpose or general-purpose or multiple-purpose or proprietary HAD unit that is able to control a particular appliance or a particular set of group of appliances based on user-commands that are entered and transmitted to the HAD from the Controlling Device. The Controlling Device conveys to the HAD the user's input or commands, typically via a wireless or non-wired communication channel. The HAD receives the user's input, typically wirelessly from the Controlling Device; and the HAD may act locally and/or directly based on the user's input (e.g., may provide an answer to a question that the user asked; or may provided immediate feedback that the user's command cannot be performed), and/or may send one or more signals to another device ("the Controlled Appliance"), instructing the Controlled Appliance to perform one or more particular operations based on the user's command and/or to modify an operational property of the Controlled Appliance.

For example, the Controlled Appliance may be a smart ceiling fan; the Controlling Device may be a smartphone; and the user's command may indicate "change the speed of the ceiling fan from current Speed 2 to new Speed 3"; the Controlling Device transmits a message with said command, wirelessly to the HAD, directly or indirectly (e.g., via a remote server; via the Internet; via a home Wi-Fi router); and the HAD sends a suitable command to the Controlled Appliance (e.g., wirelessly, via a Radio Frequency (RF) transmission, via an Infra-Red (IR) transmission, or the like). Similarly, the Controlled Appliance may be a lighting fixture (e.g., a smart ceiling lamp); the Controlling Device may be a tablet; and the user's command may indicate "dim the light by half". The Controlled Appliance may be of other suitable type, for example, a garage door, a kitchen appliance, or the like; and may be other type of electronic device, including electronic devices that are not necessarily classified as appliances. For example, the Controlled Appliance may be, in some implementations: an Air Conditioner or an air conditioning unit or an air conditioning system, a desktop fan, a mobile fan, a "Heating, Ventilation and Air Conditioning" (HVAC) unit or system, an indoor appliance, an outdoor appliance, a yard or back-yard appliance, Motorized Window Shades or Motorized Window Blinds (e.g., a system or unit that allows a user to command an electric motor to open and/or close and/or change an opening position or slanting or angle, of shades or blinds of a window or of a wall; such system or unit being powered by Alternate Current, and/or by Direct Current and/or by replaceable batteries or rechargeable batteries); a fireplace unit or system (e.g., an electric fireplace and/or gas-based fireplace, particularly such fireplace that the user may command to commence heating and/or end heating and/or change a heating level; and which utilizes electricity and/or gas and/or propane and/or other substances to generate heat); a doorbell, or a doorbell system that is optionally equipped with (or connected to) a camera or imager to capture images or video of a visitor; a smoke detector or a fire detector or a Carbon Monoxide detector; a humidifier device or unit or system; an air purifier or an air purification unit or system; a security camera; and/or other suitable appliances or devices, which may be controlled via the HAD by the end-user who utilizes his Controlling Device for this purpose.

For demonstrative purposes, the discussion above and/or herein may relate to the HAD and the Controlled Appliance as two separate devices; however, in some implementations, the HAD, or at least some functionalities or units or modules of the HAD, may be implemented integrally within the Controlled Appliance, or may be built-in in the Controlled Appliance; or in some embodiments, the HAD and the Controlled Appliance may be implemented as a single unified device, or as sharing a single unified housing or encapsulation or physical container, or otherwise being co-located, or otherwise being connected via physical and/or mechanical and/or electrical connectors or wires.

The system may utilize one or more communication protocols, for example, HTTP, HTTPS, Message Queuing Telemetry Transport (MQTT), Constrained Application Protocol (CoAP), Bluetooth, Bluetooth Low Energy (BLE), Zigbee, Z-Wave, Wi-Fi or IEEE 802.11, Cellular communication (e.g., supporting 2G or 3G or 4G or 4G-LTE or 5G communication), and/or various other protocols which may be proprietary protocols or non-proprietary protocols; and which, in some embodiments, may be utilized by the system in a concurrent or simultaneous manner. Such communication protocols may be utilized to enable direct and/or indirect communication between the Controlling Device and the HAD; and/or in order to enable direct and/or indirect communication between the HAD and the Controlled Appliance.

For example, the interaction is initiated by a user, by pressing or tapping or otherwise selecting an on-screen button or GUI element that is displayed to the user via a touch-screen of his Controlling Device, via a dedicated or native application or "app", or via a web-browser or a web-site or web-page that runs a mobile application or a web-friendly or mobile-friendly interface for controlling the Controlled Appliance. The user's command, or a message representing the user command and/or translating it or converting it into particular operations that the Controlled Appliance is commanded to perform, is then delivered to the HAD, either directly over a local wireless link (e.g., the Controlling Device and the HAD communicate directly or indirectly via a residential W-LAN or via a local Wi-Fi router), and/or indirectly via a remote server located remotely (e.g., a cloud-based server, optionally operated or controlled by a manufacturer or vendor of the HAD).

In some embodiments, the user may provide a command that the Controlling Device transfers to the HAD, which in turn transfers further to the Controlled Appliance. In other embodiments, the user's command may actually be a query or a question, which the HAD may be able to answer by itself and/or without necessarily querying the Controlled Appliance, or which the HAD may be able to answer by checking a remote resource or a remote server (and without necessarily checking with the Controlled Appliance itself), or which the HAD may be able to answer only after the HAD checks with the Controlled Appliance in order to provide the suitable answer to the user. Such question from the Controlling Device to the HAD may be, for example, "what is the current speed of the ceiling fan?", which the HAD may check with the ceiling fan itself prior to responding, or which the HAD may check via a remote server that stores an indication of the current speed of the ceiling fan, or which the HAD may already know since the HAD may locally or internally keep track of previous commands to change the speed of that ceiling fan. Similarly, the user's question via the Controlling Device to the HAD may be, for example, "how many speed levels does my ceiling fan have?", and the HAD may respond to this question based on pre-defined data that the HAD already obtained in the past with regard to the controlled ceiling fan, and/or by obtaining such data from a remote server and/or from the ceiling fan itself. In other words, the user's "command", as utilized herein, may optionally include user input that does not necessarily command to modify an operational property of the Controlled Device; but rather, may include a query or a status query or any other type of question (e.g., even "what is today's date?") that the HAD may be able to answer, either by itself and/or by consulting with another device or with a remote entity.

The Applicants have realized that some users may wish to control the Controlled Appliance even when the user (and his Controlling Device) are not in the same venue or location or residence as the Controlled Appliance. For example, a user that drives back from his work to his home, may wish to utilize her smartphone while she is still ten miles away from her home, in order to remotely activate the ceiling fan or the air conditioning unit in her home, or to otherwise command such Controlled Appliances to modify their operational properties.

The Applicants have also realized that due to various reasons, such as, the prevalence of Network Address Translation (NAT), as well as Firewalls, it is not practical and/or not feasible to have the Controlling Device directly communicate with the HAD when the Controlling Device is located away from the venue in which the HAD is located, or when the Controlling Device and the HAD are not within Wi-Fi reach of each other (e.g., within 20 or 50 meters of each other). Therefore, realized the Applicants, the Controlling Device may need to communicate with the HAD via a remote server or via a cloud-based system, without relying on a direct or local Wi-Fi connection between the Controlling Device and the HAD; in order to enable the user to control the HAD remotely via the Controlling Device while the user and his Controlling Device are located away from the immediate vicinity of the HAD.

The system of the present invention may utilize the MQTT communication protocol for such communications between the Controlling Device and the HAD. For example, the Controlling Device implements an MQTT client, and transmits MQTT messages to an MQTT server or an MQTT broker entity (e.g., cloud-based); which then relays or transmits or forwards those MQTT messages to an MQTT client in the HAD. Similarly, responses from the HAD to the Controlling Device, may travel via MQTT communications in the opposite direction.

The Applicants have also realized that users further wish that the HAD would be rapidly controllable and responsive when the user is located at home, in the immediate vicinity of the HAD (e.g., in the same room; in the same residential house; in the Wi-Fi range of the HAD). The Applicants have realized that users further desire a low-latency control of the HAD, with little or virtually no lag or delay, and with low or minimal response time between (i) pressing an on-screen button by the user on the Controlling Device, and (ii) the HAD responding to the user's input and/or the HAD causing the Controlled Appliance to operate based on the user's input, and also (ii) the touch-screen of the Controlling Device displaying a status update to indicate that the user's input was indeed received and processed or to indicate the updated operational state of the Controlled Appliance.

The Applicants have further realized that users may wish to have such low-latency or lag-free or delay-free control of the HAD and/or of the Controlled Appliance, even if the home Internet connection is experiencing high latency and/or even a complete outage. Therefore, the system of the present invention may include a HAD that is capable of using a protocol for local and/or direct wireless communication between the Controlling Device and the HAD, in a manner that is independent from (and does not rely on) the existence or the quality of an Internet connection between the user's home and a remote server or other cloud-based entity. For example, the Controlling Device and the HAD may communicate locally and/or directly over a direct Wi-Fi communication link between them, or locally yet indirectly via a local Wi-Fi network that is spanned and managed by a local Wi-Fi router (which may continue to operate even if that Wi-Fi router is temporarily not able to access the public Internet); for example, via HTTP, or HTTP with TLS, or HTTPS; and/or via BLE communication which does not rely even on the venue's Wi-Fi infrastructure or network but rather utilizes the physical proximity of the Controlling Device and the HAD for transmitting, propagating and receiving the BLE radio signals directly between them.

For demonstrative purposes, some portions of the discussion herein may relate to MQTT protocol or messages or signals; however, this is only a non-limiting example, and any reference herein to "MQTT" may be construed as similarly including any other cloud-based or server-based communication mechanism or protocol or messages or signals, in which a first client transmits over the Internet a message to a remote (or cloud-based) server, which then relays or forwards or transmits over the Internet that message to a second client.

For demonstrative purposes, some portions of the discussion herein may relate to HTTP communication or messages; however, this is only a non-limiting example, and any reference herein to "HTTP" may be construed as similarly including any other communication protocol or mechanism which uses a customer's able to utilize, for example, a venue's Wi-Fi network or infrastructure to enable direct communication between the Controlling Device and the HAD; for example, HTTP, or HTTPS, or HTTP with TLS, or CoAP, or a proprietary datagram protocol or streaming protocol.

For demonstrative purposes, some portions of the discussion herein may relate to BLE communication or messages; however, this is only a non-limiting example, and any reference herein to "BLE" may be construed as similarly including any other communication protocol which does not rely on, or which does not utilize, or which is independent of, the existence and/or the characteristics of any Wi-Fi infrastructure of the venue in which the HAD is located; and which enables direct local communication between the Controlling Device and the HAD without the need for an Internet connection by any of them, and/or without the need for the venue of the HAD or the venue of the Controlling Device to have an Internet connection or to have an operational Wi-Fi network that can access the public Internet; and may include, for example, Bluetooth, BLE, BLE Mesh, Wi-Fi Direct, Zigbee, Z-Wave, or other or proprietary point-to-point communication links and/or mesh networks.

The system of the present invention may thus enable a Controlling Device to efficiently and rapidly control the HAD (and through it, the Controlled Appliance) under a variety of scenarios and use-cases; by utilizing multiple communication protocols, such as MQTT and HTTP and BLE.

The Applicants have realized that a particular mechanism may be required in order to manage the parallel utilization of such multiple communication protocols, in order to avoid duplication of the same command being transported over multiple different paths and thus resulting in non-desired operations or duplicated operations. For example, if the Controlling Device transmits the same command of "toggle the status of the light of the ceiling lamp" over two paths, then the HAD may receive the same command twice, and may instruct the Controlled Appliance twice, thereby turning-on and then turning-off the ceiling lamp and thus not affecting the user-desired change. Similarly, if the Controlling Device transmits the same command of "increase the speed of the ceiling fan to the next available speed-level" over two paths, then the HAD may receive the same command twice, and may instruct the Controlled Appliance twice, thereby causing the Controlled Appliance to actually increase its speed by two speed-levels rather than by one speed-level as originally requested by the user.

The Applicants have realized that the above-described problem may be partially mitigated by providing to the user an option in the Controlling Device to select which communication path would be used for transmitting the user's command to the HAD. However, such mechanism is not user-friendly, as many users are not familiar with the technical details involved, and/or may not perform the correct choice under the circumstances (e.g., a user may select to use BLE for transmitting the command, while the user and his Controlling Device are located three miles away from the HAD), or the user may not perform the optimal choice under the circumstances (e.g., the user selects to utilize MQTT while the user and his Controlling Device are located five feet away from the HAD; the MQTT messaging would work, but may introduce unnecessary latency or delay).

The Applicants have realized that another partial solution may utilize a Round Robin Failover mechanism: for example, the Controlling Device initially attempts to communicate with the HAD via the highest-priority protocol (e.g., via HTTP); if the HAD (and/or the Controlled Appliance) did not respond or did not operate based on the user's command within a pre-defined time period (e.g., within N seconds, such as within 2 seconds), then the Controlling Device attempts to utilize the next protocol in a pre-defined ordered list for transmitting subsequent messages to the HAD. This approach frees the user from having to select a choice of protocol; yet this approach suffers from multiple drawbacks. First, a message from the Controlling Device to the HAD may be lost, particularly if the currently-used communication protocol fails; the user is frustrated due to the failure, and may need to repeat the manual entry of the command (e.g., tapping the on-screen button again and again). Second, even if the method does work, it may lead to sub-optimal or increased latency; for example, failing over to delayed MQTT messaging while the user and her Controlling Device are located at home in proximity to the HAD.

The Applicants have realized that another partial solution may utilize a Round Robin Failover mechanism with Re-transmission: for example, the previously-described mechanism is used, yet a message that failed to be delivered to the HAD is re-transmitted by the Controlling Device to the HAD using the next-available protocol after a pre-defined timeout elapses. This approach may mitigate the "lost message" problem, but may introduce new or other drawbacks. For example, in some scenarios, the initial message may have been successfully received at the HAD and/or at the Controlled Appliance, but only the reply (from the Controlled Appliance and/or from the HAD) failed to be delivered back; and in such case, the re-transmission of the command would cause the Controlled Appliance to perform the command twice, which is not the original intent of the user. Additionally or alternatively, the latency may increase or "spike" when switching to the next-available protocol, because the Controlling Device waits until the timeout elapses before re-transmitting; the Timeout period is typically on the order of magnitude of several seconds (e.g., 3 seconds), whereas users expect a latency on the order of magnitude of milliseconds (e.g., 100 milliseconds).

The Applicants have also realized that another partial solution may utilize a mechanism of monitoring and priority failover. For example, a background software service in the Controlling Device continuously monitors the performance and/or characteristics of each available communication protocol, by sending keep-alive messages (or "ping" messages) and measuring the round-trip latency for each protocol. Then, when it is time to send a real message based on actual user input, the Controlling Device select to utilize the communication protocol having the lowest latency in the most-recent test attempt or test attempts. Alternatively, the communication protocol with the lowest cost score (e.g., a weighted combination of latency and other cost components, such as bandwidth cost) may be used for protocol selection. However, the Applicants have realized that this approach may introduce drawbacks or problems; for example: (a) the implementation may be relatively complex and/or error-prone; (b) the mechanism requires unnecessary traffic for the keep-alive messages, with the associated bandwidth costs, and with other costs involved, such as, draining a battery of the Controlling Device; (c) even with this mechanism, it is still possible that the selected communication protocol will be sub-optimal or would even fail to deliver the message to the HAD, due to dynamic changes and fluctuations in quality or the characteristic of the relevant connections and communication links (e.g., Internet, Wi-Fi, Radio Frequency or RF); (d) the mechanism may fail to make the optimal choice of protocol in the presence of jitter (e.g., random changes in latency), or in scenarios of high packet loss, as past measurements of a particular protocol may not be a reliable indicator of future effectiveness of that protocol.

The present invention may thus provide an improved mechanism to eliminate or reduce or prevent some or all of the above-mentioned problems, and/or to achieve or to enable some or all of the following tasks or goals: (a) be transparent to the user, and not require user selection or user intervention; (b) recover automatically from packet loss; (c) achieve the lowest possible latency; (d) avoid wasteful keep-alive messages; (e) low complexity of implementation; (f) works well in the presence of jitter; (g) ensure that a message is acted upon only once, and/or be robust to reception of a re-transmitted message.

Reference is made to FIG. 1, which is a schematic illustration of a system 100, in accordance with some demonstrative embodiments of the present invention. System 100 may comprise a Controlling Device 101, which a user may utilize in order to send messages or commands to a HAD 102, which in turn may communicate (based on the user's commands) with a Controlled Appliance 103.

For demonstrative purposes, portions of the discussion herein may relate to sending a message (e.g., a control message) from the Controlling Device 101 to the HAD 102; however, similar mechanisms or operations may be utilized for sending a message (e.g., an Acknowledgment message, a status message, or the like) from the HAD 102 to the Controlling Device 101; and/or for sending messages from the HAD 102 to the Controlled Appliance 103 (which may be equipped, optionally, with one or more units that may be similar to the components or modules or units of the Controlling Device 101); and/or for sending messages from the Controlled Appliance 103 to the HAD 102; and/or for sending messages from the Controlling Device 101 to the Controlled Appliance 103; and/or for sending messages from the Controlled Appliance 103 to the Controlling Device.

The Controlling Device 101 may communicate with the HAD 102 through a direct Wi-Fi communication link established directly between them; or via a direct Bluetooth/BLE communication link established directly between them; or via other direct wireless communication link or channel between them. The Controlling Device 101 may thus send HTTP or HTTPS messages to the HAD 102 via such direct Wi-Fi channel; and the HAD 102 may respond directly to the Controlling Device 101 via the same direct Wi-Fi channel between them.

Additionally or alternatively, the Controlling Device 101 may communicate with the HAD 102 through an indirect Wi-Fi communication link or through a Wireless LAN (W-LAN) that is operational in the venue in which the Controlling Device 101 and the HAD 102 are located; for example, via a Wi-Fi wireless network that is constructed and managed via a residential Wireless Router 105. It is noted that the Wireless Router 105 may optionally also provide access to the public Internet, to one or more devices that are wirelessly connected to the Wireless Router 105; such as, to the Controlling Device 101 and/or to the HAD 102; however, as detailed herein, such Internet access via the Wireless Router 105 is not necessary and is not required in order to establish indirect Wi-Fi communications between the Controlling Device 101 and the HAD 102, which may communicate between them through the Wireless Router 105 even if that Wireless Router 105 does not have Internet connection.

Additionally or alternatively, the Controlling Device 101 an the HAD 102 may communicate between them indirectly by sending and receiving MQTT messages, via a remote (e.g., cloud-based) MQTT Server 106. For example, the Controlling Device 101 may comprise or may implement an MQTT Module 124, such as an MQTT client module; and similarly, the HAD 102 may comprise or may implement an MQTT module 145. The Controlling Device 101 may transmit an MQTT message to the remote MQTT Server 106, for example, by accessing it through a cellular transceiver 123 of the Controlling Device 101, or by accessing it indirectly via a Wi-Fi transceiver 121 of the Controlling Device which in turn may access the Internet via the Wireless Router 105; thereby enabling the Controlling Device 101 to exchange MQTT messages with the HAD 102 through the remote MQTT Server 106. Similarly, HAD 102 may receive such incoming MQTT messages from the remote MQTT Server 106, for example, by accessing it through a cellular transceiver of the HAD 102, or by accessing it indirectly via a Wi-Fi transceiver 141 of the HAD 102 which in turn may access the Internet via the Wireless Router 105; thereby enabling the HAD 102 to exchange MQTT messages with the Controlling Device 101 through the remote MQTT Server 106.

The Controlling Device 101 comprises a Controlling Application 111, which provides to the user an on-screen display with GUI elements that the user can engage with. For example, The user may utilize the touch-screen of the Controlling Device 101 (e.g., a smartphone), to tap or click on an on-screen button that reads "increase the speed of the Ceiling Fan from the current speed to the next-available speed-level"; the Controlling Application 111 generates a first message and transmits it (directly or indirectly) to the HAD 102; which in turn generates a second message (which may be different in its format from the second message) and sends it (directly or indirectly) to the Controlled Appliance 103 (e.g., the Ceiling Fan).

A high-level module or unit in the Controlling Device 101 and/or in the Controlling Application 111 is implemented as an Interactor Module 112; it calls or invokes a Requestor Module 113 or a requestor function on an object in the Controlling Application 111 that is referred to as Communication Coordinator Module 114.

The Wye Module 114 in the Controlling Device 101 generates a random or pseudo-random number (e.g., 64-bit or 128-bit), referred to (and utilized) as a Message-ID. A Message Constructor Module 115 in the Controlling Device 112 generates and constructs the actual message to be transmitted to the HAD 102. The generated message may comprise two (or more) message-portions or message-segments, for example: the unique Message-ID of this message, and the message payload (e.g., an indication that the Ceiling Fan is instructed to increase its speed by one speed-level). In some embodiments, the Message-ID may be a random or pseudo-random string of characters; or a unique token or nonce; or a Universally Unique Identifier (UUID) or a Globally Unique Identifier (GUID). In other embodiments, the Message-ID may include a fixed portion (e.g., a message-portion that uniquely identifies the particular Requestor Module 113 and/or the particular Controlling Application 111 that is about to send this message, or the particular instance of that Controlling Application 111) and a non-fixed portion (e.g., a sequence number that is sequentially increased by 1 or by other pre-defined interval, to uniquely identify the particular message among other messages that were sent or that will be sent by this particular instance of the Controlling Application 111).

The Controlling Device 101 may comprise multiple transceivers, or multiple modules able to transmit and/or receive messages or packets by utilizing different communication protocols. In a demonstrative embodiment, the Controlling Device 101 comprises a Wi-Fi transceiver 121, a Bluetooth/BLE transceiver 122, and a Cellular transceiver 123. Furthermore, in a demonstrative embodiment, the Controlling Device 101 may comprise multiple, different, transmission modules able to perform or initiate the actual transmission of message by the different transceivers and in accordance with various communication protocols. For example, an HTTPS module 131 may be responsible for transmitting messages to the HAD 102 over an HTTPS communication link (e.g., indirectly, via a remote server which is accessed over the Internet, such as via the Wi-Fi Transceiver 121 and/or the Cellular Transceiver 123); a Bluetooth/BLE module 132 may be responsible for transmitting messages to the HAD 102 over a Bluetooth/BLE communication link via the Bluetooth/BLE Transceiver 122; an MQTT module 133 may be responsible for transmitting messages to the HAD 102 using the MQTT protocol, indirectly via a remote MQTT server (e.g., which is accessed via the Wi-Fi Transceiver 121 and/or the Cellular Transceiver 123).

Once the user of the Controlling Device initiates the user command, the message is generated with its unique Message-ID portion; and the Communication Coordinator Module 114 proceeds to immediately trigger all the modules 131-133 to transmit that message (having the same Message-ID) over all available protocols or transports. Accordingly, for example, the same message, having the same Message-ID component or portion, is sent to the HAD 102 via HTTPS and also via Bluetooth/BLE and also via MQTT; such transmissions may occur simultaneously or concurrently, or at least partially concurrently, or in a consecutive immediate order (e.g., to reduce wireless interference among multiple transceivers operating at the same time).

For example, the same message is sent via all the three protocols to the HAD 102; which, in turn, may receive all of these messages, or only some of them, or only one of them, or none of them. The HAD 102 acts immediately upon the receipt of the first message that was actually received at the HAD 102, out of the several messages that were sent by the Controlling Device 101 with the same Message-ID.

For example, the HAD 102 is equipped with a Wi-Fi transceiver 141 and a Bluetooth/BLE transceiver 142; and further comprises communication modules able to handle various communication protocols, e.g., an HTTPS module 143, a Bluetooth/BLE module 144, and an MQTT module 145. In an example, the HAD 102 receives the first message via Bluetooth/BLE; uses its Message Parsing Module 146 to parse or process the message, extracting from it the command portion (e.g., command the ceiling fan to increase its speed by one speed-level) and the Message-ID portion; and proceeds to immediately transmit to the relevant Controlled Appliance 103 (e.g., the ceiling fan in this example) a new message that conveys the user's command, wherein the new message is, for example, constructed locally within the HAD 102 via its Message Constructor Module 147.

Upon receiving the first message from the Controlling Device 101 (out of several duplicate messages that the Controlling Device sent, having the same Message-ID), the HAD 102 sends via its ACK Module 148 an acknowledgment (ACK) response to the Controlling Device 111 (e.g., via the same communication channel through which that message was received at the HAD 102; or, in some embodiments, through all the communication channels that are available to the HAD 102 for communicating with the Controlling Device 101). The ACK module 148 of the HAD 102 inserts or injects or appends or otherwise includes in the ACK message a copy of the Message-ID portion of the message whose safe receipt at the HAD 102 is being acknowledged. A Messages Tracking Cache Unit 149 in the HAD 102 is updated by a Messages Tracker Unit 150 of the HAD 102; for example, the Messages Tracker Unit 150 adds a new entry or record into the database or data-structure of the Messages Tracking Cache Unit 149, the new entry or record being (for example) a copy of the entire message that was received (including its Message-ID), or being divided into the Message-ID portion and the message-payload portion.

Subsequently, for example after two seconds, the HAD 102 receives again a message having the same Message-ID, but via another communication channel (e.g., via MQTT). The HAD 102 extracts from the received message its Message-ID; and a Message Duplication Detector 151 of the HAD 102 searches or checks in the Messages Tracking Cache Unit 149 whether a message with the same Message-ID was already received at the HAD 102. If the checking result is positive, then the HAD 102 does not act upon this new message since it is a duplicate of a previously-received and previously-acted-upon message; for example, the HAD 102 may discard the duplicate message, or may store it too in the Messages Tracking Cache Unit 149 (e.g., optionally with an indication that it is a duplicate messages that was not acted upon again)., or may send back an ACK message to the Controlling Device 111 (e.g., via the same communication channel that transported the duplicate message to the HAD 102, and/or via other available communication channels) in order to re-confirm to the Controlling Application 111 that this message (identified via its Message-ID) was indeed received at the HAD 102. The ACK message may be freshly generated for the duplicate message; or may even be a duplicate ACK message identical to a previous ACK message that was previously generated for the previous message having the same Message-ID (e.g., stored by the ACK module 148 in a local cache of ACK messages within the HAD 102). Only if an incoming message has a Message-ID that does not already appear in the Messages Tracking Cache Unit 149, does the HAD 102 proceed to act on such message.

In the Controlling Device 101, the Message Constructor Module 115 is responsible for handling the ACK responses, for de-duplicating messages, and for monitoring and handling timeouts. For example, the Message Constructor Module 115 forwards the first successful ACK response to a Messages Tracker 116 within the Controlling Device 111 and/or to the Requestor Module 113 and/or to the Interactor Module 112; thereby updating these modules that the particular message having that Message-ID was confirmed as received at the HAD 102. Subsequent ACK responses, which are received from the HAD 102 and which have the same Message-ID (e.g., which already appears in the Messages Tracker 116 within the Controlling Device 111), may be ignored or discarded. The Communication Coordinator Module 114 may further utilize a Timeout Monitoring Module 117, to check whether a pre-defined timeout period (e.g., 2 or 3 or 5 of 7 or 8 seconds, or N seconds) has elapsed since a particular message was firstly sent out by the Controlling Device 101 and an ACK response was not received for its Message-ID; and in such case of lack of ACK within the pre-defined timeout period, the Communication Coordinator Module 114 sends an error notification or a Negative ACK (NACK) message to the Requestor Module 113 and/or to the Interactor Module 112.

The above-described system may achieve some or all of the previously-described goals; and may further be augmented or improved in order to provide robustness to packet loss, by implementing a particular retry/re-transmission mechanism. For example, a different pre-defined retry/re-transmission mechanism or scheme may be associated (and utilized) with each one of the communication channels or transports that are used by the Communication Coordinator Module 114. In a demonstrative embodiment, for example, a particular message is transmitted from the Controlling Device 101 to the HAD 102 via an MQTT channel; if the Controlling Device 101 does not receive an ACK response for the Message-ID of that message via MQTT within N1 seconds (e.g., within 2 seconds), then: the Communication Coordinator Module 114 re-transmits the same message (and with the same Message-ID in it) again over MQTT; then: if the Controlling Device 101 still does not receive an ACK response for the Message-ID of that message via MQTT within N2 seconds (e.g., within an additional period of 2 seconds), then: the Communication Coordinator Module 114 re-transmits the same message (and with the same Message-ID in it) yet again for the third time over MQTT; then: if the Controlling Device 101 still does not receive an ACK response for the Message-ID of that message via MQTT within N3 seconds (e.g., within an additional period of 3 seconds), then: the Communication Coordinator Module 114 re-transmits the same message (and with the same Message-ID in it) again for the fourth and last time over MQTT. Meanwhile, concurrently with (or in parallel to) these four transmission events (one initial transmission and three periodical re-transmissions) via MQTT, the Communication Coordinator Module 114 also transmits (and re-transmits) the same message, having the same Message-ID, via HTTPS and/or via Bluetooth/BLE, while implementing a pre-defined re-transmission scheme for each one of them. Each re-transmission scheme may be tailored to the communication channel, and may define the number of allowed or required re-transmissions, the time intervals to wait between re-transmissions (which may be non-fixed time intervals; or may be random or pseudo-random within a pre-defined range, such as, a pseudo-random waiting period in the range of 1.5 to 2.5 seconds). All such transmissions and/or re-transmissions are ceased immediately upon: (i) receiving the first ACK response from the HAD 102 regarding this Message-ID, or (ii) elapsing of a pre-defined global timeout (e.g., 7 or 9 seconds) that the Communication Coordinator Module 114 utilizes for all such concurrent retries or re-transmissions since the first transmission of the message having that Message-ID; according to the sooner out of these two options.

Some implementations of the system may lead to a slightly increased operational cost in certain situations; for example, if the operator of the HAD pays per MQTT transmission, and the user and his Controlling Device 101 are both located at home in direct proximity (e.g., three feet away) from the HAD 102 which can be accessed via Wi-Fi or Bluetooth/BLE without requiring MQTT messaging. However, such implementations may be adjusted to reduce such costs, while still maintaining a high-quality/low-latency user experience. For example, some implementations may be a hybrid system that combines both the above-mentioned functionality of the Communication Coordinator Module 114 together with the prioritized fallback (or failover) approach described above; such that, the Communication Coordinator Module 114 monitors and tracks of the latency and the failure rate of the several previous (e.g., most recent) HTTP requests and/or BLE requests; if the observed latency and failure rate are below a pre-defined threshold, then the Communication Coordinator Module 114 would (for example) skip the first MQTT transmission for each outgoing message from the Controlling Device 101 to the HAD 102, but would still send the first and second re-transmissions via MQTT as well (in addition to HTTPS and/or Bluetooth/BLE re-transmission, in parallel). This way, when the user is at home and is experiencing acceptable latency over HTTPS and/or Bluetooth/BLE, virtually no MQTT traffic is ever transmitted or used. However, immediately when even one message, which was sent via HTTPS and Bluetooth/BLE, does not receive back its ACK from the HAD 102 within N1 seconds (e.g., within 2 seconds), the Communication Coordinator Module 114 initiates further re-transmissions for that message (and optionally, for all messages that are sent within the next M minutes) also via MQTT messaging. Such modified implementation limits the waiting time during the failover to N1 seconds (e.g., to approximately 2 seconds in this example).

The HAD manufacturer or vendor or operator may weigh the user experience degradation due to this slight delay, against the cost savings due the lower volume of MQTT traffic and/or reduced number of MQTT transmissions. In other embodiments, the manufacturer or vendor or operator may enable the end-user of the Controlling Device 101 to configure or to select the level of service or the Quality of Service (QoS) or the Quality of Experience (QoE) that she is willing to purchase; for example, enabling the end-user to select a first option of "I wish to always get the highest available QoS even if it would cost me more money", or to select a second option of "I wish to save on costs as long as I do not need to wait more than 3 seconds for my Ceiling Fan to respond to my command", or to select other suitable options that are associated with various payment plans.

Alternatively, some implementations may activate and utilize MQTT communications for all the messages sent from the Controlling Device 101 to the HAD 102; such as, to ensure the highest possible QoS or QoE, or for debugging purposes or for customer support purposes. Furthermore, since no "keep alive' messages are required by the system of the present invention, excessive costs are not incurred when the end-user is idle and is not commanding the HAD 102 via his Controlling Device 101; rather, some MQTT messaging costs may be incurred only when the end-user is actively commanding the HAD 102 via his Controlling Device 101, which may be sparse or non-frequent.

Some embodiments of the present invention may thus utilize simultaneous or concurrent use of multiple IoT/wireless communication protocols or channels, as well as unique mechanism for caching of requests/commands and for avoiding a recipient device from acting multiple times on the same command that was transmitted over multiple communication channels or paths. Some embodiments may deliver a high QoS or QoE for the HAD system, even when the venue (e.g., residential home) is experiencing slow or spotty Internet service or even a complete outage of Internet service. For example, concurrent utilization of HTTPS and Bluetooth/BLE channels, still enables the end-user to flawlessly and efficiently control the HAD 102 from his Controlling Device 101. As the end-user walks from the bedroom where her ceiling fan is located, to the other end of her house, and then out to her backyard, the user's Controlling Device may seamlessly transition from utilizing Bluetooth/BLE, to utilizing HTTPS, and then to utilizing MQTT via her cellular network, for the purpose of delivering a command from the Controlling Device to the HAD; all this in a user-transparent manner, and without the user being aware of the different communication protocols being used, and without the user suffering from latency or delays, and without the system dropping or losing or re-performing any of the user's commands.

It is noted that the HAD may communicate with the Controlled Appliance using one or more of the communication methods that were described above; and/or by other suitable communication methods, for example, by sending Infra-Red (IR) signals from the HAD to the Controlled Appliance, by sending Radio Frequency (RF) signals from the HAD to the Controlled Appliance, by means of a wired link or cable or wire connecting the HAD to the Controlled Appliance, and/or via other suitable methods of communication.

Some embodiments of the present invention may comprise suitable mechanisms for handling, detecting, reporting, notifying and/or processing errors or error signals or NACK signals, by the HAD and/or by the Controlling Device and/or by the Controlled Appliance, and/or by other elements or components of the system. For example, the first-obtained positive or successful ACK signal, may be propagated or transported immediately as an ACK message from the HAD to the Controlling Device; such as, via the same transport protocol that was used for transporting the particular message that is now acknowledged, and/or via a plurality of transport channels. However, transport of NACK signals or NACK messages, or error signals or error messages, may be performed via other mechanisms. For example, in some embodiments, one or more types of error signals (e.g., authorization errors) are not necessarily propagated or transported from the HAD to the Controlling Device unless all of the available communication channels or transport channels have reached their respective time-out threshold value. This may provide to the system robustness against mis-configuration of one (or more) of the communication channels or transport mechanisms.

Some embodiments, optionally, need not necessarily store or cache full copies of all messages in the cache or repository; but rather, may optionally discard or erase or delete or purge redundant messages or message-portions, as well as messages or message-portions that do provide new insights to the system with regard to success or failure of a transport of a particular message from the Controlling Device to the HAD (or vice versa). Some embodiments, for example, may only store or cache or track non-idempotent messages in the cache; whereas, in contrast, idempotent requests (e.g., GET requests), need not be cached or deduplicated or tracked, because there is no change in state when the Controlled Appliance acts on the command.

In some embodiments, the memory resources which may be utilized or required in order to implement the cache or the repository, may be reduced or minimized by one or more suitable techniques; for example, by implementing or enforcing or utilizing a protocol in which non-idempotent requests Never contain a message body or a copy of the actual message payload, but rather, they only contain a status code or a status indicator or other reduced-size representation which requires a smaller or reduced-size memory capacity in order to be cached or stored. In contrast, the idempotent Requests (e.g., GET requests or messages) may have large message-bodies or payload portions in their replies, which would thus require a greater volume of memory to cache or store. In some embodiment, a suitable controller or component or module may automatically purge or reduce the size of the cache or repository; for example, by analyzing already-cached message(s) and/or a message that is intended to be cached, and by converting one or more messages (e.g., previously-cached, or intended-to-be cached) from a first format (e.g., full message payload) to a reduced-size format (e.g., discarding or replacing at least a portion of the message payload with a reduced-size representation or indicator or place-holder); in order to reduce the memory foot-print or the memory utilization of the caching and/or tracking mechanism.

In some embodiments, a method comprises: (a) constructing in an electronic device of a user, a control message indicating a user command intended to be performed by a Home Automation Device (HAD) of said user; wherein the constructing comprises: inserting into the control message a unique Message-Identifier; (b) transmitting said control message, from said electronic device of the user, to said HAD of the user, concurrently via at least two different wireless communications channels which comprise at least: (i) a first wireless communication channel that includes passage of traffic through the Internet, and (ii) a second wireless communication channel in which no traffic passes through the Internet.

In some embodiments, said unique Message-Identifier, which is comprised in said control message, enables said HAD to determine whether or not said control message is a duplicate re-transmission of said control message.

In some embodiments, the method comprises: checking whether an acknowledgement message is received back at said electronic device from said HAD within N seconds of said transmitting of the message, wherein N is a positive number; if the checking result is negative, then: (I) performing re-transmission of said control message towards said HAD using a first re-transmission scheme via said first wireless communication channel, and also, concurrently, (II) performing re-transmission of said control message towards said HAD using a second, different, re-transmission scheme via said second wireless communication channel.

In some embodiments, the first re-transmission scheme, which is used for the first wireless communication channel, defines a first number of re-transmissions to be attempted and defines a first timeout period for re-transmissions; wherein the second re-transmission scheme, which is used for the second wireless communication channel, defines a second, different, number of re-transmissions to be attempted and defines a second, different, timeout period for re-transmissions;

In some embodiments, step (b) comprises: transmitting from said electronic device to said HAD in a Bluetooth transmission, a first copy of said control message having therein said unique Message-Identifier; transmitting from said electronic device to said HAD in an HTTPS transmission, a second copy of said control message having therein said unique Message-Identifier; transmitting from said electronic device to said HAD via an MQTT transmission, a third copy of said control message having therein said unique Message-Identifier; wherein said control message comprises said same unique Message-Identifier in each one of: the Bluetooth transmission, the HTTPS transmission, and the MQTT transmission.

In some embodiments, the MQTT transmission is performed in a time-slot that is at least partially overlapping with a time slot of at least one of: the Bluetooth transmission, the HTTPS transmission.

In some embodiments, step (b) comprises: transmitting from said electronic device to said HAD, the control message having therein said unique Message-Identifier, concurrently via a Bluetooth communication channel and via an HTTPS communication channel and via an MQTT communication channel.

In some embodiments, the method comprises: based on the control message received at the HAD from said electronic device, generating and transmitting an Infra-Red signal from the HAD to a controlled appliance, wherein the IR signal indicates to the controlled appliance to modify an operational property of said controlled appliance.

In some embodiments, the method comprises: based on the control message received at the HAD from said electronic device, generating and transmitting a Radio Frequency signal from the HAD to a controlled appliance, wherein the RF signal indicates to the controlled appliance to modify an operational property of said controlled appliance.

In some embodiments, the method comprises: based on the control message received at the HAD from said electronic device, generating and transmitting a wireless signal from the HAD to a controlled appliance, wherein the wireless signal indicates to the controlled appliance to modify an operational property of said controlled appliance; wherein the wireless signal that transports said wireless signal from the HAD to the controlled appliance, is transported in accordance with a wireless communication protocol that is different from a wireless communication protocol utilized for transporting the control message from the electronic device to the HAD.

In some embodiments, the method comprises: based on the control message received at the HAD from said electronic device, generating and transmitting an Infra-Red signal from the HAD to a ceiling fan, wherein the IR signal indicates to the ceiling fan to modify an operational property of said ceiling fan.

In some embodiments, the method comprises: based on the control message received at the HAD from said electronic device, generating and transmitting a Radio Frequency signal from the HAD to a ceiling fan, wherein the RF signal indicates to the ceiling fan to modify an operational property of said ceiling fan.

In some embodiments, the method comprises: based on the control message received at the HAD from said electronic device, generating and transmitting a wireless signal from the HAD to a ceiling fan, wherein the wireless signal indicates to the ceiling fan to modify an operational property of said ceiling fan; wherein the wireless signal that transports said wireless signal from the HAD to the ceiling fan, is transported in accordance with a wireless communication protocol that is different from a wireless communication protocol utilized for transporting the control message from the electronic device to the HAD.

In some embodiments, the HAD is integrally built-in within a ceiling fan; wherein step (b) comprises: transmitting said control message, from said electronic device of the user, to said HAD that is integrally built-in within said ceiling fan, concurrently via at least said two different wireless communications channels.

In some embodiments, said control message comprises at least a command to modify an operational property of a ceiling fan that is implemented as a separate unit from said HAD.

In some embodiments, the method comprises: based on the control message received at the HAD from said electronic device, generating and transmitting a Radio Frequency (RF) signal from the HAD to a Motorized Window Shades unit, wherein the RF signal indicates to the Motorized Window Shades unit to modify an operational property of said Motorized Window Shades unit; wherein said control message comprises at least a command to modify an operational property of said Motorized Window Shades unit that is implemented as a separate unit from said HAD. Optionally, an Infra-Red signal may be used, or other wireless signals may be used.

In some embodiments, the method comprises: based on the control message received at the HAD from said electronic device, generating and transmitting a Radio Frequency (RF) signal from the HAD to a Fireplace unit, wherein the RF signal indicates to the Motorized Window Shades unit to modify an operational property of said Fireplace unit; wherein said control message comprises at least a command to modify an operational property of said Fireplace unit that is implemented as a separate unit from said HAD. Optionally, an Infra-Red signal may be used, or other wireless signals may be used.

In some embodiments, an apparatus includes a home automation device (HAD) which comprises: a hardware processor to execute code; a Bluetooth transceiver configured to receive data directly from an electronic device of a user via a direct Bluetooth communication link established between the home automation device and the electronic device; a Wi-Fi transceiver, configured (i) to receive HTTPS data from said electronic device over a local Wi-Fi connection that does not pass through the Internet, and (ii) to receive MQTT messages from said electronic device over an Internet connection and through a remote server; a message duplication detector unit, (a) to detect that said home automation device received wirelessly two incoming messages having a same unique Message-Identifier via two different communication channels, and (b) to perform only one time, and not twice, a home automation command indicated in both of the two incoming messages.

In some embodiments, the message duplication detector unit is to detect duplicate incoming messages by checking whether a local cache of received messages already contains a particular Message-Identifier value.

In some embodiments, the apparatus comprises: an acknowledgment module, (i) to respond with a first ACK message to first incoming message that has a particular Message-Identifier and that is acted upon, and (ii) to also respond with a second ACK message to a second incoming message that has the same particular Message-Identifier and that is not acted upon.

In some embodiments, the first ACK message is transmitted from the home automation device to the electronic device via a particular communication route and a particular communication channel that delivered the first incoming message from the electronic device to the home automation device; wherein the second ACK message is transmitted from the home automation device to the electronic device via another communication route and another communication channel that delivered the second incoming message from the electronic device to the home automation device.

In some embodiments, each one of the two incoming messages comprises an indication of a user command to change an operational property of an appliance that is controlled remotely via said home automation device.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
    (a) constructing in an electronic device of a user, a Ceiling Fan control message indicating a user command intended to be conveyed by a Home Automation Device (HAD) of said user to a Ceiling Fan of said user and intended to be performed by said Ceiling Fan;
        wherein the constructing comprises: inserting into said Ceiling Fan control message a Message-Identifier;
    (b) transmitting concurrently, from said electronic device of the user, to said HAD of the user: (i) a first copy of said Ceiling Fan control message via an HTTPS transmission in which traffic passes through the Internet, and (ii) a second copy of said Ceiling Fan control message via a direct local Bluetooth transmission between the electronic device of the user and the HAD of the user, in which traffic does not pass through the Internet;
        wherein the first copy of said Ceiling Fan control message which is transmitted via HTTPS, and the second copy of said Ceiling Fan control message which is transmitted via Bluetooth, have same said Message-Identifier;
        wherein the Bluetooth transmission of the second copy of the Ceiling Fan control message is performed in a time-slot that is at least partially overlapping with a time slot of the HTTPS transmission of the first copy of the Ceiling Fan control message.

2. The method of claim 1, further comprising:
    based on the Ceiling Fan control message received at the HAD from said electronic device, generating and transmitting an Infra-Red signal from the HAD to said Ceiling Fan,
    wherein said Infra-Red signal indicates to the Ceiling Fan to modify an operational property of said Ceiling Fan.

3. The method of claim 1, further comprising:
    based on the Ceiling Fan control message received at the HAD from said electronic device, generating and transmitting a Radio Frequency signal from the HAD to said Ceiling Fan,
    wherein said Radio Frequency signal indicates to the Ceiling Fan to modify an operational property of said Ceiling Fan.

4. The method of claim 1,
    wherein said Ceiling Fan control message is a command to modify an operational property of said Ceiling Fan which is implemented as a separate unit from said HAD.

5. The method of claim 1,
    wherein said electronic device of the user, in which said Ceiling Fan control message is constructed, is a device selected from the group consisting of: a smartphone, a tablet.

6. The method of claim 1,
    wherein the method comprises:
    (c) checking whether an acknowledgement message is received back at said electronic device from said HAD within N seconds of the transmitting of step (b), wherein N is a positive number;
    (d) if the checking result is negative, then: (I) performing re-transmission of said Ceiling Fan control message towards said HAD using a first re-transmission scheme via HTTPS, and also, concurrently, (II) performing re-transmission of said Ceiling Fan control message towards said HAD using a second, different, re-transmission scheme via Bluetooth;
        wherein the first re-transmission scheme, which is used for HTTPS re-transmission of the Ceiling Fan control message, defines a first number of re-transmissions to be attempted over HTTPS and defines a first timeout period for HTTPS re-transmissions;
        wherein the second re-transmission scheme, which is used for Bluetooth re-transmission of the Ceiling Fan control message, defines a second, different, number of re-transmissions to be attempted over Bluetooth and defines a second, different, timeout period for Bluetooth re-transmissions.

7. A method comprising:
    (a) constructing in an electronic device of a user, a Ceiling Fan control message indicating a user command intended to be conveyed by a Home Automation Device (HAD) of said user to a Ceiling Fan of said user and intended to be performed by said Ceiling Fan;
        wherein the constructing comprises: inserting into said Ceiling Fan control message a Message-Identifier;
    (b) transmitting concurrently, from said electronic device of the user, to said HAD of the user: (i) a first copy of said Ceiling Fan control message via an HTTPS transmission, and (ii) a second copy of said Ceiling Fan control message via an MQTT transmission;
        wherein the first copy of said Ceiling Fan control message which is transmitted via HTTPS, and the second copy of said Ceiling Fan control message which is transmitted via MQTT, have same said Message-Identifier;
        wherein the MQTT transmission of the second copy of the Ceiling Fan control message is performed in a time-slot that is at least partially overlapping with a time slot of the HTTPS transmission of the first copy of the Ceiling Fan control message.

8. The method of claim 7, further comprising:
based on the Ceiling Fan control message received at the HAD from said electronic device, generating and transmitting an Infra-Red signal from the HAD to said Ceiling Fan,
wherein said Infra-Red signal indicates to the Ceiling Fan to modify an operational property of said Ceiling Fan.

9. The method of claim 7, further comprising:
based on the Ceiling Fan control message received at the HAD from said electronic device, generating and transmitting a Radio Frequency signal from the HAD to said Ceiling Fan,
wherein said Radio Frequency signal indicates to the Ceiling Fan to modify an operational property of said Ceiling Fan.

10. The method of claim 7,
wherein said Ceiling Fan control message is a command to modify an operational property of said Ceiling Fan which is implemented as a separate unit from said HAD.

11. The method of claim 7,
wherein said electronic device of the user, in which said Ceiling Fan control message is constructed, is a device selected from the group consisting of: a smartphone, a tablet.

12. The method of claim 7,
wherein the method comprises:
(c) checking whether an acknowledgement message is received back at said electronic device from said HAD within N seconds of the transmitting of step (b), wherein N is a positive number;
(d) if the checking result is negative, then: (I) performing re-transmission of said Ceiling Fan control message towards said HAD using a first re-transmission scheme via HTTPS, and also, concurrently, (II) performing re-transmission of said Ceiling Fan control message towards said HAD using a second, different, re-transmission scheme via MQTT;
wherein the first re-transmission scheme, which is used for HTTPS re-transmission of the Ceiling Fan control message, defines a first number of re-transmissions to be attempted over HTTPS and defines a first timeout period for HTTPS re-transmissions;
wherein the second re-transmission scheme, which is used for MQTT re-transmission of the Ceiling Fan control message, defines a second, different, number of re-transmissions to be attempted over MQTT and defines a second, different, timeout period for MQTT re-transmissions.

13. A method comprising:
(a) constructing in an electronic device of a user, a Ceiling Fan control message indicating a user command intended to be conveyed by a Home Automation Device (HAD) of said user to a Ceiling Fan of said user and intended to be performed by said Ceiling Fan;
wherein the constructing comprises: inserting into said Ceiling Fan control message a Message-Identifier;
(b) transmitting concurrently, from said electronic device of the user, to said HAD of the user: (i) a first copy of said Ceiling Fan control message via a Bluetooth transmission, and (ii) a second copy of said Ceiling Fan control message via an MQTT transmission;
wherein the first copy of said Ceiling Fan control message which is transmitted via Bluetooth, and the second copy of said Ceiling Fan control message which is transmitted via MQTT, have same said Message-Identifier;
wherein the MQTT transmission of the second copy of the Ceiling Fan control message is performed in a time-slot that is at least partially overlapping with a time slot of the Bluetooth transmission of the first copy of the Ceiling Fan control message.

14. The method of claim 13, further comprising:
based on the Ceiling Fan control message received at the HAD from said electronic device, generating and transmitting an Infra-Red signal from the HAD to said Ceiling Fan,
wherein said Infra-Red signal indicates to the Ceiling Fan to modify an operational property of said Ceiling Fan.

15. The method of claim 13, further comprising:
based on the Ceiling Fan control message received at the HAD from said electronic device, generating and transmitting a Radio Frequency signal from the HAD to said Ceiling Fan,
wherein said Radio Frequency signal indicates to the Ceiling Fan to modify an operational property of said Ceiling Fan.

16. The method of claim 13,
wherein said Ceiling Fan control message is a command to modify an operational property of said Ceiling Fan which is implemented as a separate unit from said HAD.

17. The method of claim 13,
wherein said electronic device of the user, in which said Ceiling Fan control message is constructed, is a device selected from the group consisting of: a smartphone, a tablet.

18. The method of claim 13,
wherein the method comprises:
(c) checking whether an acknowledgement message is received back at said electronic device from said HAD within N seconds of the transmitting of step (b), wherein N is a positive number;
(d) if the checking result is negative, then: (I) performing re-transmission of said Ceiling Fan control message towards said HAD using a first re-transmission scheme via Bluetooth, and also, concurrently, (II) performing re-transmission of said Ceiling Fan control message towards said HAD using a second, different, re-transmission scheme via MQTT;
wherein the first re-transmission scheme, which is used for MQTT re-transmission of the Ceiling Fan control message, defines a first number of re-transmissions to be attempted over MQTT and defines a first timeout period for MQTT re-transmissions;
wherein the second re-transmission scheme, which is used for Bluetooth re-transmission of the Ceiling Fan control message, defines a second, different, number of re-transmissions to be attempted over Bluetooth and defines a second, different, timeout period for Bluetooth re-transmissions.

* * * * *